United States Patent Office 3,360,359
Patented Dec. 26, 1967

3,360,359
3-ARYLAMINOPOLYHALOCYCLOALK-2-EN-1-ONES AS HERBICIDES
Everett E. Gilbert and Benjamin Veldhuis, Morris Township, Morris County, N.J., assignors to Allied Chemical Corporation, New York, N.Y., a corporation of New York
No Drawing. Filed June 5, 1964, Ser. No. 373,036
17 Claims. (Cl. 71—121)

ABSTRACT OF THE DISCLOSURE

Disclosed are herbicidal compositions comprising as active ingredients 1-arylamino-2-chlorotetrafluorocyclopentenones and 1-arylamino-2-chlorohexafluorocyclohexenones having the formulas:

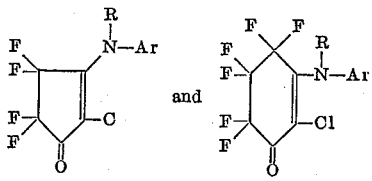

wherein R is hydrogen or lower alkyl, and wherein Ar is a phenyl radical or a substituted phenyl radical selected from the group consisting of halophenyl, lower alkylphenyl, lower alkoxyphenyl, lower haloalkylphenyl, lower alkylhalophenyl, and lower haloalkylhalophenyl, and methods for combatting growth of undesirable vegetation by subjecting the same to the herbicidal action of such compositions.

This invention relates to herbicides. More specifically, this invention relates to the control of undesirable plant life with arylaminohalocyclic ketones.

An object of the present invention is to provide herbicidal compositions and process which exhibit a high degree of selectivity for undesirable vegetation and noxious weeds without appreciably adversely affecting desirable crops. Another object of the invention is to provide herbicidal compositions which are not only highly selective but effective in both pre- and post-emergence treatments.

These objects are attained to a high degree of success by use of 1-arylamino-2-chlorotetrafluorocyclopentenones and 1-arylamino-2-chlorohexafluorocyclohexenones having the formulas:

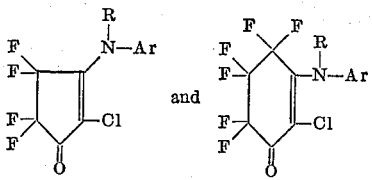

wherein R is selected from the group consisting of hydrogen and alkyl radicals having up to 5 carbon atoms, i.e., 1 to 5 carbon atoms, inclusive, and Ar is selected from the group consisting of phenyl and substituted phenyl radicals. The phenyl radical can be substituted in one or more positions with a member selected from the group consisting of halogens, alkyl radicals having up to 5 carbon atoms, alkoxy radicals, and haloalkyl radicals.

The compounds of the present invention can be prepared according to the process disclosed in the copending application of Gilbert and Veldhuis, Ser. No. 373,056, filed June 5, 1964.

Illustrative of the compounds employed in the herbicidal compositions and methods of this invention include the following:

1-(4-chlorophenyl amino)-2-chlorotetrafluorocyclopentenone-3
1-(3-chlorophenyl amino)-2-chlorotetrafluorocyclopentenone-3
1-(3-chloro-4-methylphenyl amino)-2-chlorotetrafluorocyclopentenone-3
1-(3,4-dichlorophenyl amino)-2-chlorotetrafluorocyclopentenone-3
1-(3-trifluoromethylphenyl amino)-2-chlorotetrafluorocyclopentenone-3
1-(N-ethylphenyl amino)-2-chlorotetrafluorocyclopentenone-3
1-(N-methylphenyl amino)-2-chlorotetrafluorocyclopentenone-3
1-(2-methylphenyl amino)-2-chlorotetrafluorocyclopentenone-3
1-(3-methylphenyl amino)-2-chlorotetrafluorocyclopentenone-3
1-(4-methylphenyl amino)-2-chlorotetrafluorocyclopentenone-3
1-(4-methoxyphenyl amino)-2-chlorotetrafluorocyclopentenone-3
1-phenyl amino-2-chlorotetrafluorocyclopentenone-3
1-(2-ethylphenyl amino)-2-chlorotetrafluorocyclopentenone-3
1-(3-trifluoromethyl-6-chlorophenyl amino)-2-chlorotetrafluorocyclopentenone-3
1-(2,3-dichlorophenyl amino)-2-chlorotetrafluorocyclopentenone-3
1-(3,5-dichlorophenyl amino)-2-chlorotetrafluorocyclopentenone-3
1-(2,4-dichlorophenyl amino)-2-chlorotetrafluorocyclopentenone-3
1-(2,5-dichlorophenyl amino)-2-chlorotetrafluorocyclopentenone-3

The 6-membered ketones are exemplified as follows:

1-(4-chlorophenyl amino)-2-chlorohexafluorocyclohexenone-3
1-(3-chlorophenyl amino)-2-chlorohexafluorocyclohexenone-3
1-(3-chloro-4-methylphenyl amino)-2-chlorohexafluorocyclohexenone-3
1-(3,4-dichlorophenyl amino)-2-chlorohexafluorocyclohexenone-3
1-(3-trifluoromethylphenyl amino)-2-chlorohexafluorocyclohexenone-3
1-(N-ethylphenyl amino)-2-chlorohexafluorocyclohexenone-3
1-(N-methylphenyl amino)-2-chlorohexafluorocyclohexenone-3
1-(2-methylphenyl amino)-2-chlorohexafluorocyclohexenone-3
1-(3-methylphenyl amino)-2-chlorohexafluorocyclohexenone-3
1-(4-methylphenyl amino)-2-chlorohexafluorocyclohexenone-3
1-(4-methoxyphenyl amino)-2-chlorohexafluorocyclohexenone-3
1-phenyl amino-2-chlorohexafluorocyclohexenone-3
1-(2-ethylphenyl amino)-2-chlorohexafluorocyclohexenone-3
1-(3-trifluoromethyl-6-chlorophenyl amino)-2-chlorohexafluorocyclohexenone-3

1-(2,3-dichlorophenyl amino)-2-chlorohexafluorocyclo-
hexenone-3
1-(3,5-dichlorophenyl amino)-2-chlorohexafluorocyclo-
hexenone-3
1-(2,4-dichlorophenyl amino)-2-chlorohexafluorocyclo-
hexenone-3
1-(2,5-dichlorophenyl amino)-2-chlorohexafluorocyclo-
hexenone-3

The above compounds are highly effective in preventing undesirable plant growth. Certain compounds are particularly effective contact herbicides to control established weeds, while others are highly effective as pre-emergence herbicides.

The herbicidal compositions of the invention are prepared by admixing one or more of the compounds defined above in herbicidally effective amounts with a material of the kind used and referred to in the herbicide and pest control art as an adjuvant, carrier, or diluent in order to provide formulations adapted for ready and efficient application to soil or weeds (i.e., unwanted plants) using conventional applicator equipment. In other words, the active ingredient is mixed with an additional material or materials of the kind known in the art to provide a formulation adapted for ready application by conventional means such as through suitable jets, nozzles, spreaders and similar devices. The herbicidal compositions may be prepared in the form of a solid or liquid such as a solution, emulsion, suspension, paste, wettable powder, granules, pellets, or dust according to the intended use. Solid compositions for example, may be prepared in the form of wettable powders and are compounded to give homogeneous free-flowing powders by milling or admixing the active ingredient with finely divided solids such as clay, fuller's earth, diatomaceous earth, charcoal, chalk, and the like, together with wetting and dispersing surface-active agents. Solid compositions may also be in the form of dust formulations which may be prepared by mixing or blending the active ingredient with a finely divided solid carrier as indicated above, or the active ingredient may be impregnated on or incorporated into granules or pellets.

Liquid compositions may be prepared as solutions, pastes, or in the usual way by admixing the active ingredient with a suitable liquid solvent which may thereafter, if desired, be homogeneously incorporated into a solvent carrier (e.g., No. 2 fuel oil), or water, preferably with a surface-active agent, that is, an emulsifying agent. The inert solvent employed in the liquid preparation should preferably not have any toxic effects on humans and desirably should be odorless and not readily flammable. In addition, the solvent should not have any corrosive effect on the storage vessels. Examples of suitable solvents include xylene, alkylated naphthalenes, water-immiscible ketones, and heavy aromatic naphthas.

The surface-active agents employed with the solid or liquid compositions can be of the anionic, cationic or nonionic type. Such compounds can be found listed by J. B. McCutcheon in "Soap and Chemical Specialties" for December 1957, and January, February, March and April of 1958.

Generally, the surface-active agent will not comprise more than about 1 to 10% by weight of the formulation.

In a preferred procedure, the compounds of the present invention are applied in the form of a spray solution. These sprays can be made as simple solutions by dissolving the active ingredient in solvents such as aromatic weed oil, kerosene, and No. 2 fuel oil. The spray compositions can also be applied as aqueous stem and foliar sprays or as sprays directly to the surface of the soil. The amount of the active ingredient present in the compositions as actually applied for destroying, preventing or controlling weeds will vary with the manner of application, the particular weeds for which control is sought, the purpose for which the application is being made and like variables.

Generally however, the herbicidal compositions as applied in the form of a spray or a dust will contain from about 1 to 25% by weight of the active ingredient.

Certain compounds of the present invention are selective toward small seed annual grasses and broadleaf plants, and so are effective against the most common weeds, but have little effect on such valuable crops such as corn, soybeans, and wheat.

If desired, there may be included in the herbicidal compositions of the invention other pest control agents such as, fungicides, insecticides, as well as other herbicidal agents.

The following specific examples are given to illustrate the effectiveness of the herbicides of this invention.

*Example I*

To demonstrate herbicidal effectiveness of certain compounds of the present invention, greenhouse post-emergence tests were conducted. The compounds were applied at the rate of 16 pounds per acre by the method of Shaw and Swanson (Weeds, vol. 1, No. 4, page 352, July 1952). In determining the effect of the herbicidal compounds on weeds, each species was given an injury rating. The injury ratings were made according to a numerical scale of 0 to 10 as follows:

0=no effect.
1, 2, 3=slight injury, plants usually recover with little or no reduction in yield.
4, 5, 6=moderate injury, plants usually recover with reduced yields.
7, 8, 9=severe injury, plants usually do not recover.
10=all plants killed.

Tests were made against rape (representative of broadleaf weeds) and ryegrass (representative of grassy weeds). Results are as follows:

| Compound* | Ryegrass | Rape |
|---|---|---|
| 1 | 3 | 10 |
| 2 | 1 | 9 |
| 3 | 9 | 10 |
| 4 | 10 | 9 |
| 5 | 8 | 0 |
| 6 | 8 | 1 |
| 7 | 10 | 0 |
| 8 | 9 | 1 |
| 9 | 7 | 0 |
| 10 | 7 | 1 |
| 11 | 9 | 4 |
| 12 | 10 | 2 |
| 13 | 10 | 10 |
| 14 | 7 | 10 |
| 15 | 10 | 10 |

*1. 1-(3-chlorophenyl amino)-2-chlorotetrafluorocyclopentenone-3.
2. 1-(3-chloro-4-methyl phenyl amino)-2-chlorotetrafluorocyclopentenone-3.
3. 1-(3,4-dichlorophenyl amino)-2-chlorotetrafluorocyclopentenone-3.
4. 1-(3-trifluoromethylphenyl amino)-2-chlorotetrafluorocyclopentenone-3.
5. 1-(N-ethylphenyl amino)-2-chlorotetrafluorocyclopentenone-3.
6. 1-(N-methylphenyl amino)-2-chlorotetrafluorocyclopentenone-3.
7. 1-(2-methylphenyl amino)-2-chlorotetrafluorocyclopentenone-3.
8. 1-(3-methylphenyl amino)-2-chlorotetrafluorocyclopentenone-3.
9. 1-(4-methylphenyl amino)-2-chlorotetrafluorocyclopentenone-3.
10. 1-(4-methoxyphenyl amino)-2-chlorotetrafluorocyclopentenone-3.
11. 1-phenyl amino-2-chlorotetrafluorocyclopentenone-3.
12. 1-(2-ethylphenyl amino)-2-chlorotetrafluorocyclopentenone-3.
13. 1-(4-chlorophenyl amino)-2-chlorohexafluorocyclohexenone-3.
14. 1-(3-trifluoromethylphenyl amino)-2-chlorohexafluorocyclohexenone-3.
15. 1-(3,4-dichlorophenyl amino)-2-chlorohexafluorocyclohexenone-3.

The following example illustrates the effectiveness of 1-(4-chlorophenyl amino) - 2 - chlorotetrafluorocyclopentenone-3 as both a pre- and post-emergence herbicide.

EXAMPLE II

Tests were conducted in the greenhouse against weeds and crops at 16 pounds per acre using the method of Shaw and Swanson (Weeds, vol. 1, #4, page 352, July 1952).

PRE-EMERGENCE GREENHOUSE HERBICIDE TESTS

| Corn | | | Cotton | | | Wheat | | | Ryegrass | | Rape | |
|---|---|---|---|---|---|---|---|---|---|---|---|---|
| 1 | 2 | 3 | 1 | 2 | 3 | 1 | 2 | 3 | 1 | 3 | 1 | 3 |
| 0 | 0 | 0 | 1 | 10 | 10 | 1 | 0 | 12 | 5 | 45 | 7 | 65 |

Index to symbols: 1=injury rating (0=none; 1–3=slight; 2–4=moderate; 7–9=severe; 10=all plants killed). 2=percent height reduction. 3=percent plants killed.

POST-EMERGENCE GREENHOUSE HERBICIDE TESTS— INJURY RATINGS

| Compound | Ryegrass | Rape |
|---|---|---|
| 1-(4-chlorophenyl amino)-2-chlorotetrafluoro-cyclopentenone-3 | 1 | 9 |

As can be seen from the above 1-(4-chlorophenyl amino)-2-chlorotetrafluorocyclopentenone-3 used, post-emergence is effective on broadleaf plants with little or no injury to grasses.

EXAMPLE III

In this example the following compounds of the present invention were arbitrarily selected for outdoor field evaluation during the summer of 1961, both pre- and post-emergence on crops and weeds. The crops were planted on August 29 and treatment applied August 30. The treatments were rated on September 20. The compounds were applied at 4, 8, and 16 pounds per acre. The procedure was to plant 10 to 12 crops in double rows, twenty inchs apart (lengthwise). The area is then overseeded with rape and ryegrass to insure broadleaf weed and grass indicator.

For the pre-emergence treatment

One to two days after planting the crops, apply (material) to 1/200 acre plots, laid out to cross the rows, using hand push type sprayer with four No. 730154 Spraying System Company nozzles at 30 p.s.i.g. air pressure. Apply in 40 gallon per acre diluent (acetone or water).

Ratings made about three weeks after chemicals applied.

Post-emergence

Apply materials 10 to 12 days after planting (after first set of true leaves).

Rated 10 to 12 days later.

PRE-EMERGENCE FIELD TESTS—INJURY RATING

| Cpd.* | Lbs. per Acre | Weeds | | Crops | | | | |
|---|---|---|---|---|---|---|---|---|
| | | Broad-leaf | Grassy | Wheat | Sweet corn | Field corn | Soy-beans | Squash |
| 1 | 8 | 7 | 4 | 2 | 0 | 0 | 3 | 1 |
| | 16 | 9 | 8 | 5 | 0 | 0 | 4 | 3 |
| 2 | 4 | 6 | 0 | 0 | 0 | 0 | 0 | 2 |
| | 8 | 8 | 3 | 2 | 0 | 0 | 3 | 2 |
| | 16 | 9 | 6 | 3 | 0 | 0 | 5 | 4 |

POST-EMERGENCE FIELD TESTS—INJURY RATING

| Cpd.* | Lbs. per Acre | Weeds | | Crops | |
|---|---|---|---|---|---|
| | | Broad-leaf | Grassy | Sweet corn | Field corn |
| 1 | 8 | 9.5 | 2 | 1 | 1 |
| | 16 | 9.8 | 2 | 1 | 1 |
| | 4 | 9 | 1 | 0 | 0 |

*1. 1-(4-chlorophenyl amino)-2-chlorotetrafluorocyclopentenone-3.
2. 1-(3,4-dichlorophenyl amino)-2-chlorotetrafluorocyclopentenone-3.

As can be seen from the above example, 1-(4-chlorophenyl amino)-2-chlorotetrafluorocyclopentenone-3 and 1 - (3,4-dichlorophenyl amino)-2-chlorotetrafluorocyclopentenone-3 exhibit herbicidal properties as crop use herbicides. 1-(4-chlorophenyl amino)-2-chlorotetrafluorocyclopentenone-3- exhibits non-selective herbicidal activity pre-emergence but post-emergence it effectively controlled broadleaf plants and it was only slightly injurious to grass plants. 1-(3,4-dichlorophenyl amino)-2-chlorotetrafluorocyclopentenone-3 used pre-emergence exhibits greater herbicidal activity on broadleaf weeds than grasses and post-emergence at four pounds per acre, it effectively controlled broadleaf weeds with little or no effect on grasses or grass type plants.

EXAMPLE IV

The pre-emergence portion of Example 2 was repeated using the following compounds:

PRE-EMERGENCE GREENHOUSE HERBICIDE TESTS

| Cpd. | Corn | | | Cotton | | | Wheat | | | Soybeans | | | Rye-grass | | Rape | |
|---|---|---|---|---|---|---|---|---|---|---|---|---|---|---|---|---|
| | 1 | 2 | 3 | 1 | 2 | 3 | 1 | 2 | 3 | 1 | 2 | 3 | 1 | 3 | 1 | 3 |
| 13 | 0 | 0 | 0 | 1 | 10 | 0 | 0 | 0 | 0 | 0 | 0 | 0 | 7 | 70 | 9 | 90 |
| 14 | 2 | 5 | 10 | 1 | 6 | 5 | 0 | 0 | 0 | 2 | 9 | 11 | 3 | 25 | 9 | 95 |

13. 1-(4-chlorophenyl amino)-2-chlorohexafluorocyclohexenone-3.
14. 1-(3-trifluoromethylphenyl amino-2-amino)-2-chlorohexafluorocyclohexenone-3.

The pre-emergence results of 1-(4-chlorophenyl amino) 2-chlorohexafluorocyclohexenone-3 showed good to excellent weed control with no crop injury. The pre-emergence results of 1-(3-trifluoromethylphenyl amino) 2-chlorohexafluorocyclohexenone-3 showed good broadleaf weed control, light grass control and very little crop injury.

Post-emergence results of 1-(4-chlorophenyl amino) 2 - chlorohexafluorocyclohexenone - 3 showed excellent non-selective contact activity; 1-(3-trifluoromethylphenyl-amino)-2-chlorohexafluorocyclohexanone-3 showed good non-selective contact activity; and 1-(3,4-dichlorophenyl amino)-2-chlorohexafluorocyclohexenone-3 showed good to excellent non-selective contact activity as shown in Example 1, supra.

We claim:
1. A method for the control of undesired vegetation comprising applying to the locus to be protected in an amount sufficient to exert herbicidal action, a member selected from the group consisting of compounds having the general formulas:

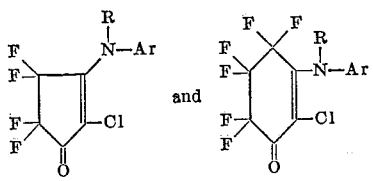

and wherein Ar is a phenyl radical or a substituted phenyl radical selected from the group consisting of halophenyl, lower alkylphenyl, lower alkoxyphenyl, lower haloalkylphenyl, lower alkylhalophenyl, and lower haloalkylhalophenyl and R is a member selected from the group consisting of hydrogen and lower alkyl radicals.

2. A method for the control of undesired vegetation comprising applying to the locus to be protected in an amount sufficient to exert herbicidal action a compound having the formula:

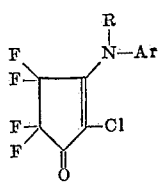

wherein Ar is a phenyl radical or a substituted phenyl radical selected from the group consisting of halophenyl, lower alkylphenyl, lower alkoxyphenyl, lower haloalkylphenyl, lower alkylhalophenyl, and lower haloalkylhalophenyl and R is a member selected from the group consisting of hydrogen and lower alkyl radicals.

3. A method for the control of undesired vegetation comprising applying to the locus to be protected in an amount sufficient to exert herbicidal action a compound having the formula:

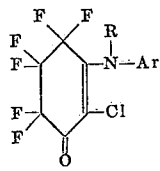

wherein Ar is a phenyl radical or a substituted phenyl radical selected from the group consisting of halophenyl, lower alkylphenyl, lower alkoxyphenyl, lower haloalkylphenyl, lower alkylhalophenyl, and lower haloalkylhalophenyl and R is a member selected from the group consisting of hydrogen and lower alkyl radicals.

4. A herbicidal composition comprising an inert carrier and, in an amount sufficient to exert herbicidal action, a member selected from the group consisting of compounds having the formulas:

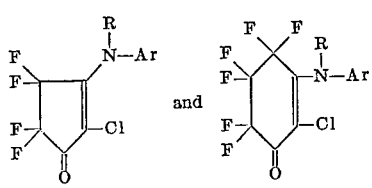

and wherein Ar is a phenyl radical or a substituted phenyl radical selected from the group consisting of halophenyl, lower alkylphenyl, lower alkoxyphenyl, lower haloalkylphenyl, lower alkylhalophenyl, and lower haloalkylhalophenyl and R is a member selected from the group consisting of hydrogen and lower alkyl radicals.

5. A herbicidal composition comprising an inert carrier and, in an amount sufficient to exert herbicidal action, a compound having the formula:

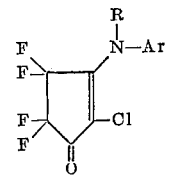

wherein Ar is a phenyl radical or a substituted phenyl radical selected from the group consisting of halophenyl, lower alkylphenyl, lower alkoxyphenyl, lower haloalkylphenyl, lower alkylhalophenyl, and lower haloalkylhalophenyl and R is a member selected from the group consisting of hydrogen and lower alkyl radicals.

6. A herbicidal composition comprising an inert carrier and, in an amount sufficient to exert herbicidal action, a compound having the formula:

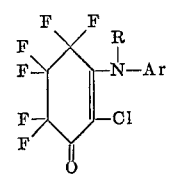

wherein Ar is a phenyl radical or a substituted phenyl radical selected from the group consisting of halophenyl, lower alkylphenyl, lower alkoxyphenyl, lower haloalkylphenyl, lower alkylhalophenyl, and lower haloalkylhalophenyl and R is a member selected from the group consisting of hydrogen and lower alkyl radicals.

7. The method as defined in claim 2 wherein said compound is 1-(3,4-dichlorophenyl amino)-2-chlorotetrafluorocyclopentenone-3.

8. The method as defined in claim 2 wherein said compound is 1-(4-chlorophenyl amino)-2-chlorotetrafluorocyclopentenone-3.

9. The method as defined in claim 2 wherein said compound is 1-(3-trifluoromethylphenyl amino)-2-chlorotetrafluorocyclopentenone-3.

10. The method as defined in claim 2 wherein said compound is 1-phenyl amino-2-chlorotetrafluorocyclopentenone-3.

11. The method as defined in claim 2 wherein said compound is 1-(2-ethylphenyl amino)-2-chlorotetrafluorocyclopentenone-3.

12. The method as defined in claim 3 wherein said compound is 1-(3,4-dichlorophenyl amino)-2-chlorohexafluorocyclohexenone-3.

13. The method as defined in claim 3 wherein said compound is 1-(4-chlorophenyl amino)-2-chlorohexafluorocyclohexenone-3.

14. The method as defined in claim 3 wherein said compound is 1-(3-trifluoromethylphenyl amino)-2-chlorohexafluorocyclohexenone-3.

15. The method as defined in claim 3 wherein said compound is 1-phenyl amino-2-chlorohexafluorocyclohexenone-3.

16. The method as defined in claim 3 wherein said compound is 1-(2-ethylphenyl amino)-2-chlorohexafluorocyclohexenone-3.

17. The method as defined in claim 1 wherein the amount used to exert herbicidal action is about 1 to 100 lbs. per acre.

(References on following page)

References Cited

UNITED STATES PATENTS

| | | | |
|---|---|---|---|
| 2,657,126 | 10/1953 | Stewart et al. | 71—2.3 |
| 2,972,563 | 2/1961 | Richter | 167—30 |
| 3,088,817 | 5/1963 | Richter | 71—2.3 |
| 3,063,821 | 11/1962 | Weil | 71—123 |

OTHER REFERENCES

Dreier et al.: Tetrahedron Letters, 1964, 1951–1954.
McBee et al.: J. Org. Chem. 30, 3698–3705 (1965).

LEWIS GOTTS, *Primary Examiner.*

M. M. KASSENOFF, *Assistant Examiner.*